W. H. VAN GUILDER.
MOLDING MACHINE.
APPLICATION FILED SEPT. 9, 1913.
1,173,229.
Patented Feb. 29, 1916.
2 SHEETS—SHEET 1.
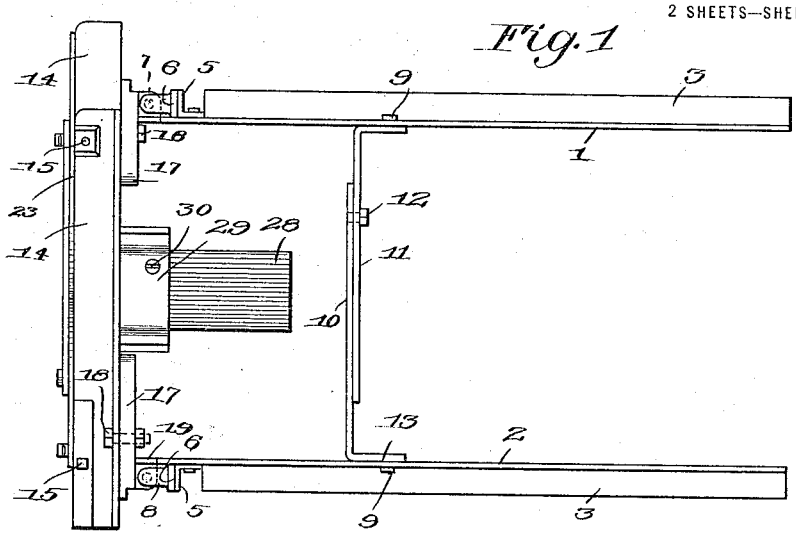
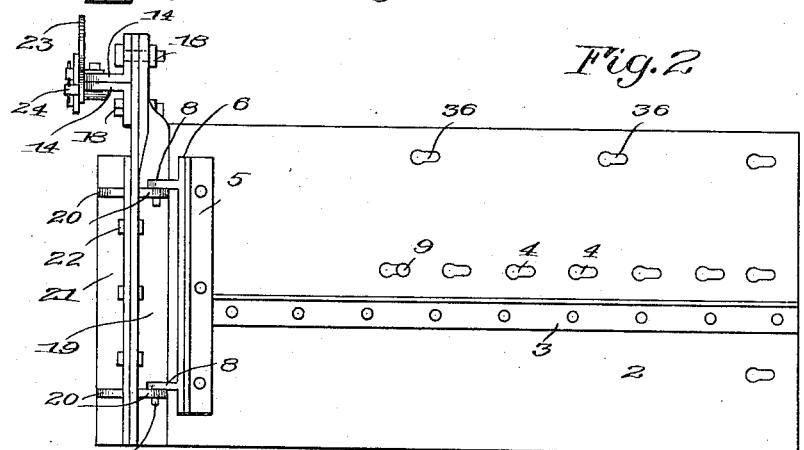
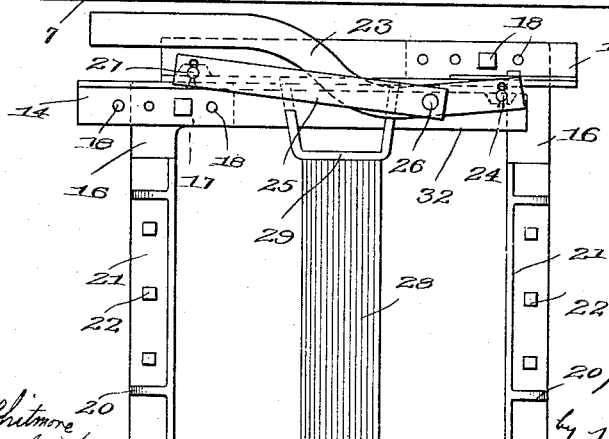

W. H. VAN GUILDER.
MOLDING MACHINE.
APPLICATION FILED SEPT. 9, 1913.
1,173,229.
Patented Feb. 29, 1916.
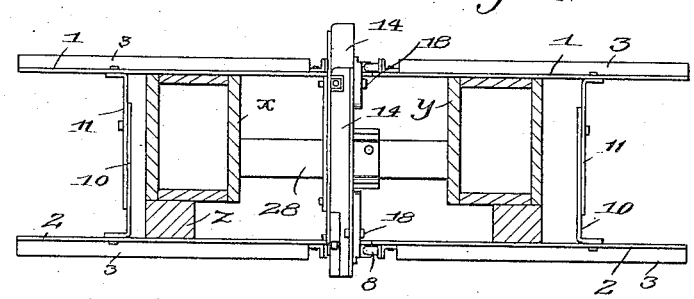
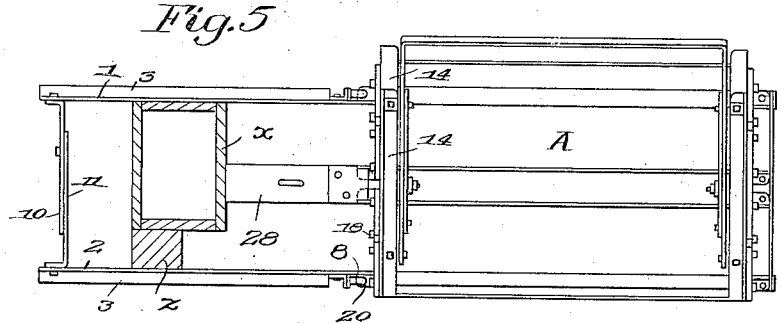
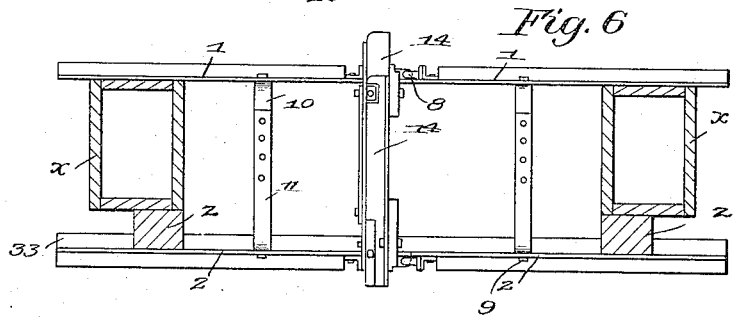
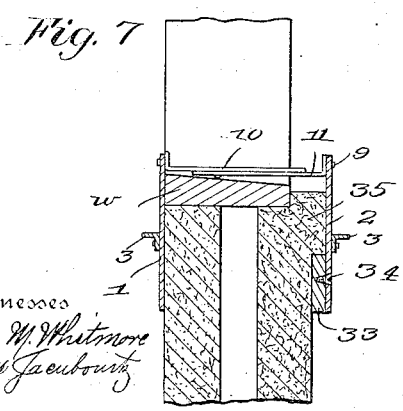
Witnesses
Ada W. Whitmore
Frances Jacubourg
Inventor
Will H. Van Guilder
By H. H. Simms
his Attorney

UNITED STATES PATENT OFFICE.

WILL H. VAN GUILDER, OF NEW ROCHELLE, NEW YORK.

MOLDING-MACHINE.

1,173,229.  Specification of Letters Patent.  Patented Feb. 29, 1916.

Application filed September 9, 1913. Serial No. 789,007.

*To all whom it may concern:*

Be it known that I, WILL H. VAN GUILDER, of New Rochelle, in the county of Westchester and State of New York, have invented a new and useful Improvement in Molding-Machines, which improvement is fully set forth in the following specification and shown in the accompanying drawings.

The present invention relates to molding machines and is designed more particularly for use in connection with that type of molding machine disclosed in the applications of Willis N. Britton filed July 5th, 1910 and Dec. 30th, 1911, the serial numbers of which are, respectively, 570,485 and 668,682, an object of this invention being to provide a structure for forming molding chambers in proximity to window and door frames and also between two window or door frames where the aforesaid Britton machines are incapable of being placed.

To these and other ends the invention consists in certain parts and combinations of parts all of which will be hereinafter described, the novel features being pointed out in the appended claims.

In the drawings: Figure 1 is a plan view of a machine constructed in accordance with the present improvements; Fig. 2 is a view of the machine in side elevation; Fig. 3 is an end view of the machine; Fig. 4 shows the machine in plan adjusted for forming a molding chamber between two window frames; Fig. 5 shows the machine connected to one of the aforesaid Britton machines for forming a molding space between the Britton machine and the window frame; Fig. 6 is a plan view showing the molding machine adjusted for forming a window sill; Fig. 7 is a section through the machine adjusted to form a cement window sill about the sill of the window frame; and Fig. 8 is a detail view of a device on the hollow forming member which device acts to support the supporting member of the two mold walls.

According to the present invention, the mold preferably embodies two mold walls 1 and 2 formed from sheet iron and having, on their outer faces, pieces of angle iron 3 riveted thereto to strengthen them. Substantially midway between the upper and lower edges of these two walls, a plurality of locking or bayonet slots 4 are provided extending in a line longitudinally and horizontally of each wall from one edge of such wall to a point slightly beyond the center of the wall, the narrow portions of the slots being disposed toward such edge.

The openings 4 are provided for receiving headed projections 9 arranged upon the ends of a tie piece for connecting the walls 1 and 2. Preferably this tie piece is extensible, and to this end is formed by two members 10 and 11 overlapping each other and connected by one or more bolts 12 which pass through suitable openings in the overlapped portions, a suitable number of openings being provided to permit an extension or contraction of the tie piece. The ends of these members 10 and 11 carry laterally deflected portions 13 on which the headed projections 9 are arranged. The two members 10 and 11 are first adjusted to a length corresponding to the distance desired between the walls 1 and 2 and the headed bolts 9 on the ends thereof are then introduced into the enlarged portions of two bayonet slots 4 on the members 1 and 2, after which the tie piece is moved to carry the headed projections 9 into the narrow portions of the slots 4, thereby holding the walls 1 and 2 against separation.

At the vertical edge of each of the walls 1 and 2 opposite that from which the series of openings starts, a verticle reinforcing piece or angle iron 5 is provided to which is bolted or otherwise secured a hinge member 6 formed with ears 8 projecting beyond the adjacent edge and carrying alined and depending pintles 7. These pintles 7 are provided for attaching the two walls to a connecting or supporting member which may be either one of the Britton machines disclosed in the aforesaid applications, the improved connecting or supporting piece shown in this application, or any other suitable supporting member to which the walls are hinged or pivoted to turn about vertical axes.

The improved supporting member embodies two angle iron slides 14 connected together by bolts 15 in order to slide one upon the other, the bolts being rigidly secured to one member and operating in slots in the other. From these slides 14, vertical and parallel arms depend. Each of these arms embodies a casting 16 with laterally-turned ends 17 bolted at 18 to one of the slide members 14, one face of this casting 16 having a flange 19 and provided with perforated ears and eyes 20 connecting the flange with the main portion and adapted to receive the depending pintles on one of the mold walls 1 and 2. To the other face of the casting 16, an angle piece 21 is bolted at 22 and has ears 20 connecting the two sides thereof, one side of this angular piece being flush with the flange 19 on the casting 16. The ears 20 on the angle piece 21 also serve for connecting the mold walls 1 and 2 to the supporting member so that it is possible to connect a pair of mold walls on either side or on both sides of the inverted U-shaped supporting member as the latter has perforated ears on opposite sides thereof.

The inverted U-shaped supporting member has its arms adjustable one toward and from the other by reason of the fact that each of said arms is carried by a slide 14; and the movement of these slides may be effected by a lever 23 pivoted at 24 to the lower slide and having a link 25 pivoted at 26 thereto and also pivoted at 27 to the upper slide. This arrangement forms a toggle connection between the slides and the pivot 26 of the toggle is adapted to be thrown in a plane to one side of the plane through the pivots 24 and 27 so as to lock the two slides against relative movement under pressure on the two arms of the inverted U-shaped supporting member.

If it is desired to form a hollow or space in the wall molded between the two mold walls, a mold block 28 may be employed of any suitable length corresponding to the length of the wall to be molded. This mold block or piece is supported on cross or tie pieces which bridge the air space of the wall as in Britton application #570,485. On the mold block may be arranged a U-shaped member 29 screwed at 30 to the upper face of the mold block and notched at 31 in the two arms thereof to receive the depending flange 32 on the lower slide 24 and, in this way, to support the inverted U-shaped supporting member.

Assume that it is desired to form a mold space between two window frames $x$, $y$, (see Fig. 4), the arms 16 are first adjusted on their slides 14 by means of bolts 18 to correspond to the thickness of the wall and the tie pieces 10, 11 are also made to correspond in length to the thickness of the wall. A strip $z$ being first attached to the outer faces of the window frames $x$ and $y$, two pairs of mold walls 1 and 2 are secured to one of the U-shaped connecting members to extend in opposite directions therefrom, the supporting member being supported on a hollow or space-forming member 28 which corresponds in length to the distance between the frames $x$ $y$, and each pair of walls being connected by a tie piece 10 and 11, arranged as closely as possible to the inner face of the adjacent stile of the window frame so that one wall of each pair abuts the inner face of the stile and the other wall abuts the outer face of the strip $z$. The cement is then placed into the chamber thus formed and, after the cement has partially set, the machine is removed. This removal is effected by detaching, first, tie pieces 10 and 11, permitting the mold members 1 to swing on the supporting member away from the finished wall without injury to the latter. The mold walls are then detached and the supporting member removed by shifting its arms away from each other through the medium of the toggle. The mold block 28 may then be withdrawn.

In Fig. 5, the mold members 1 and 2 are shown as detachable extensions on the outer walls of the Britton machine which is represented at A and has, at its ends, ears 20 for the reception of the pintles 7 on the mold walls 1 and 2. The hollow forming block or piece 28 is detachably supported at one end on the end of the molding machine in a manner like that shown in the application of Willis N. Britton #752,130, filed on the 5th day of March, 1913 and the other end of the block 28 abuts the proximate face of the stile. The swinging or free ends of the mold walls are held together by a tie piece 11 against the strip $z$ and the inner face of the stile, thus forming a mold chamber between the machine A and the window frame, and at one end of the inner walls of said machine beyond the connecting or supporting frames of the inner and outer walls of the said Britton machine.

In Figs. 6 and 7, the machine is shown adjusted for making or molding a window sill. Two pair of mold walls 1 and 2 extend in opposite directions from the inverted U-shaped connecting or supporting member which is positioned to straddle and rest upon the window frame sill $w$ at a point near the center of the latter so that the two pairs of walls extend toward the stiles of the window frame but depend below the frame sill $w$. When so employed, one wall of each pair has a strip 33 removably secured to the inner face thereof by screws 34 so as to extend horizontally throughout the lower portion of said wall as shown in Figs. 6 and 7. This strip abuts the outer face of the complete wall of the building and its upper edge, which is flat, serves to form the under face of the sill 35. This strip also serves to separate the walls 1 and 2 a greater distance than the width of the completed wall and, in this way, causes the sill to project beyond the completed wall. The tie pieces 10, 11 rest upon the sill $w$ of the window frame with the supporting member and are connected to the walls 1 and 2 by having their headed projections 9 engaged within bayonet slots 36 which are formed in the upper parts of the walls 1 and 2.

A molding machine constructed in accordance with this invention is especially adapted for use in connection with the machines described in the aforesaid Britton applications as it permits the formation of molding chambers in proximity to window sills or frames and the like, where the Britton machines have been found incapable of properly molding walls because of the restricted spaces. The machine may be readily fitted in place and used with or without the Britton machine for performing its functions. It may be disconnected from a wall without injury to the latter and it is so formed and constructed that it may be subjected to rough usage without getting out of order.

What I claim as my invention and desire to secure by Letters Patent is:

1. In a molding machine, the combination with a supporting member, of a pair of opposed walls each pivoted to said supporting member at one end to swing about a vertical axis, and means for tying the swinging portions of the walls together at different points in the lengths of said walls.

2. In a molding machine, the combination with a supporting member of inverted U-shape, of two opposed walls each hinged to one arm of said supporting member to turn about a vertical axis, and means for tying the walls together.

3. In a molding machine, the combination with a supporting member of inverted U-shape, having its arms adjustable toward and from each other, of two opposed walls each hinged at one end to one of the arms of the supporting member to turn about a vertical axis, and means for tying the walls together.

4. In a molding machine, the combination with a supporting member, of two opposed walls each hinged at one end to the supporting member to turn about a vertical axis, and a tie piece removably secured to the walls to hold them against movement toward and from each other.

5. In a molding machine, the combination with a supporting member, of two opposed walls each hinged at one end to the supporting member to turn about a vertical axis and each provided with a horizontal series of bayonet slots, and a tie piece having headed projections at its ends to be received within the bayonet slots for the purpose of holding the opposed walls against relative movement.

6. In a molding machine, the combination with a supporting member of inverted U-shape having its two arms adjustable toward and from each other, of two opposed walls each hinged at one end to one of the arms to turn about a vertical axis and each provided with a horizontal series of bayonet slot openings, and a tie piece formed with two members adjustably connected together and each having laterally-turned ends provided with headed projections to be received within the bayonet slot openings for tying the two walls against relative movement.

7. In a molding machine, the combination with a supporting member of two pairs of opposed walls hinged to opposite sides of the supporting member to turn about vertical axes, and means for tying the members of each pair of walls together.

8. In a molding machine, the combination with an inverted U-shaped supporting member, of two pairs of opposed walls hinged to opposite sides of the arms of the supporting member to turn about vertical axes, and means for tying the members of each pair of walls together.

9. In a molding machine, the combination with an inverted U-shaped supporting member, having its arms adjustable toward and from each other, of two pairs of opposed walls hinged to said arms to swing about upright axes, each pair extending from the supporting member in a direction opposite to that in which the other pair extends.

10. In a molding machine, a supporting member embodying an inverted U-shaped member having its arms adjustable toward and from each other and provided on opposite sides with vertically arranged pivot eyes.

11. In a molding machine, a supporting member embodying two slides, a toggle for moving the said slides toward and from each other, and two arms each depending from one of the slides and each provided on opposite sides with vertically arranged pivot eyes.

12. In a molding machine, the combination with an inverted U-shaped support of a pair of opposed walls each hinged at one edge to one of the arms of the U-shaped support to swing about an upright axis, and a hollow forming member adapted to be arranged between the walls and having a portion to engage the supporting member to support the latter.

13. In a molding machine, the combination with an inverted U-shaped support, of two pairs of opposed plates hinged to opposite sides of the arms of the support to swing about upright axes, each pair extending from the supporting member in a direction opposite to that in which the other pair extends, the plates which are secured to one of said arms having strips formed on their inner faces in spaced relation to the upper edges of the plates.

WILL H. VAN GUILDER.

Witnesses:
HAROLD H. SIMMS,
ADA M. WHITMORE.

Copies of this patent may be obtained for five cents each, by addressing the "Commissioner of Patents, Washington, D. C."